US008539608B1

(12) United States Patent
Troxel (10) Patent No.: US 8,539,608 B1
(45) Date of Patent: Sep. 17, 2013

(54) INTEGRITY CHECKING AT HIGH DATA RATES (75) Inventor: Gregory Donald Troxel, Stow, MA (US)

(73) Assignees: Verizon Corporate Services Group Inc., Basking Ridge, NJ (US); Raytheon BBN Technologies Corp., Cambridge, MA (US)

(*) Notice: Subject to any disclaimer, the term of this patent is extended or adjusted under 35 U.S.C. 154(b) by 1244 days.

(21) Appl. No.: 11/039,104

(22) Filed: Jan. 20, 2005

Related U.S. Application Data (60) Provisional application No. 60/556,056, filed on Mar. 25, 2004.

(51) Int. Cl.
*H04L 29/06* (2006.01)

(52) U.S. Cl.
USPC ............ 726/30; 726/13; 726/26; 726/27; 707/687

(58) Field of Classification Search
USPC ........................................................ 726/30
See application file for complete search history.

(56) References Cited

U.S. PATENT DOCUMENTS

| | | | | | |
|---|---|---|---|---|---|
| 5,944,821 | A | * | 8/1999 | Angelo | 726/22 |
| 6,088,451 | A | * | 7/2000 | He et al. | 726/8 |
| 6,098,075 | A | * | 8/2000 | Becraft et al. | 707/999.002 |
| 6,973,305 | B2 | * | 12/2005 | McLean | 455/425 |
| 6,996,712 | B1 | * | 2/2006 | Perlman et al. | 713/161 |
| 7,009,940 | B2 | * | 3/2006 | Vialen et al. | 370/252 |
| 7,111,322 | B2 | * | 9/2006 | Slick et al. | 726/5 |
| 7,228,426 | B2 | * | 6/2007 | Sinha et al. | 713/176 |
| 7,305,564 | B2 | * | 12/2007 | Jin et al. | 713/188 |
| 7,366,496 | B2 | * | 4/2008 | Vialen et al. | 455/410 |
| 7,437,756 | B2 | * | 10/2008 | Bleumer | 726/6 |
| 7,484,097 | B2 | * | 1/2009 | Steiger et al. | 713/176 |
| 7,558,954 | B2 | * | 7/2009 | Apostolopoulos et al. | 713/161 |
| 7,774,855 | B2 | * | 8/2010 | Monroe et al. | 726/30 |
| 2002/0044552 | A1 | * | 4/2002 | Vialen et al. | 370/389 |
| 2003/0233559 | A1 | * | 12/2003 | Asano et al. | 713/189 |
| 2004/0039924 | A1 | * | 2/2004 | Baldwin et al. | 713/189 |
| 2004/0109567 | A1 | * | 6/2004 | Yang et al. | 380/277 |
| 2004/0123116 | A1 | * | 6/2004 | Jin et al. | 713/187 |

OTHER PUBLICATIONS

Tomonori, Fujita; Masanori, Ogawara. Protecting the Integrity of an Entire File System. IWIAS 2003 Proceedings. Pub. Date: 2003. Relevant pp. 95-105. Found on the World Wide Web at: http://ieeexplore.ieee.org/stamp/stamp.jsp?tp=&arnumber=1192462.*

* cited by examiner

*Primary Examiner* — Nathan Flynn
*Assistant Examiner* — Jeremiah Avery (57) ABSTRACT

A method and apparatus for receiving a group of data messages via a network is provided. A data message is received via the network (402, 602). A determination is made regarding whether the data message has an associated valid integrity check value (404, 604). When the data message is determined to have the associated valid integrity check value, a determination is made regarding whether a specific number of data messages has been received with associated valid integrity check values (418, 616). When the specific number of the data messages is determined to have been received with associated valid integrity check values, the data message is accepted (422, 618).

40 Claims, 8 Drawing Sheets

INTEGRITY CHECKING AT HIGH DATA RATES

RELATED APPLICATIONS

This application claims priority under 35 U.S.C. §119 based on U.S. Provisional Application Ser. No. 60/556,056, entitled "SYSTEM AND METHOD FOR CRYPTOGRAPHIC INTEGRITY," inventor, Gregory Donald Troxel, filed Mar. 25, 2004, the disclosure of which is incorporated herein by reference.

GOVERNMENT CONTRACT

The U.S. Government has a paid-up license in this invention and the right in limited circumstances to require the patent owner to license others on reasonable terms as provided for by the terms of Contract No. MDA904-03-C-0964, awarded by the Maryland Procurement Office.

TECHNICAL FIELD

Systems and methods consistent with the principles of the invention relate generally to communication networks and, more particularly, to integrity checking in a communication network having high data rates.

BACKGROUND OF THE INVENTION

In a communication network, such as an optical transport network, an integrity check value (ICV) may be sent with data to a destination. The receipt of a valid integrity check value with the data ensures the receiver of the data that the data received is the same as the data that was sent. The integrity check value may be a digital signature, which may authenticate a sender of the data, as well as ensure that the data received is the same as the data that was sent.

Message authentication codes, typically, are used between two parties that share a secret key in order to validate information transmitted between the parties. The integrity check value may be a result of a keyed hashed message authentication (HMAC) algorithm coupled with a well-known hash function, such as, for example, Secure Hash Algorithm 1 (SHA-1) or Message Digest Algorithm #5 (MD5), as well as other suitable algorithms. HMAC is well known and is described in *Request for Comments* 2104, Network Working Group, Krawczyk et al., February 1997.

IPsec is well known for providing security services at the Internet Protocol (IP) layer. IPsec uses two well-known protocols to provide traffic security, Authentication Header (AH) and Encapsulating Security Payload (ESP). These protocols may be used alone or in combination with each other to provide a desired set of security services.

A large integrity check field, for example 96 bits, may be generated using HMAC, for example, HMAC/SHA-1 or HMAC/MD5, in IPsec ESP and AH. In such a case, the probability of a random frame, for example, a frame including random noise, being falsely accepted with a valid ICV is $\frac{1}{2}^{96}$. Because of the expense of sending a 96 bit ICV with encrypted data, it may be desirable, in some situations, to send a smaller ICV, for example, a 32 bit value. When using a 32 bit ICV, the probability of a random frame being received with a valid ICV is $\frac{1}{2}^{32}$, or about one in four billion. Although the probability of falsely accepting random data or noise with a valid ICV appears to be quite small, when a stream of frames arrive at a line rate, such as OTU3 (40 Gb/sec), four billion frames will arrive in a fairly short period of time. Therefore, at such a high data rate, the probability that some frames are falsely accepted is unacceptably high.

SUMMARY OF THE INVENTION

In a first aspect, a method for receiving a group of data messages via a network is provided. In the method, a data message is received via the network. A determination is made regarding whether the data message has an associated valid integrity check value. When the data message is determined to have the associated valid integrity check value, a determination is made regarding whether a specific number of data messages has been received with associated valid integrity check values. When the specific number of the data messages is determined to have been received, at least some of the data messages are accepted.

In a second aspect, an apparatus for receiving data messages via a network is provided. The apparatus includes hardware logic configured to: receive a group of data messages and associated integrity check values, determine whether a predetermined number of received ones of the data messages was received with valid associated integrity check values, and accept at least one of the data messages when the hardware logic determines that the predetermined number of received ones of the data messages was received with the valid ones of the associated integrity check values.

In a third aspect, an apparatus for receiving data messages via a network is provided. The apparatus includes means for receiving a group of data messages and associated integrity check values, means for determining whether a predetermined number of received data messages includes valid associated integrity check values, and means for accepting at least one of the data messages when the means for determining determines that the predetermined number of received encrypted messages includes the valid associated integrity check values.

In a fourth aspect, a machine-readable medium having a group of instructions stored therein for a processor is provided. When the instructions are executed by a processor, the processor is configured to receive a group of data messages and associated integrity check values via a network, determine whether a predetermined number of the received data messages has associated valid integrity check values, and accept at least one of the data messages when the processor determines that the predetermined number of the data messages has associated valid integrity check values.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Exemplary System

Figure 1:
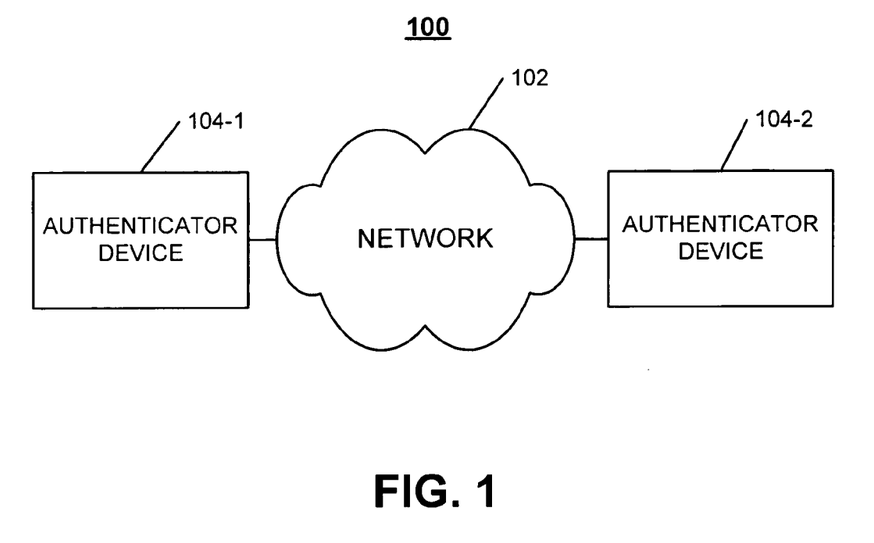
FIG. 1 illustrates an exemplary system consistent with principles of the invention.

FIG. 1 illustrates an exemplary system 100 consistent with the principles of the invention. System 100 includes a network 102, an authenticator device 104-1 and authenticator device 104-2 (collectively, authenticator devices 104) connected to network 102. System 100 may include user equipment, such as a personal computer (not shown), which may include authenticator device 104-1 or 104-2. Alternatively, system 100 may include a server (not shown) connected to any of authenticator devices 104. The server may also be connected to a local area network (not shown). FIG. 1 is an exemplary system and may have more or fewer components than as shown.

Network 102 may include a Synchronous Optical NETwork (SONET), which is a high speed fiber-optic network, or an Optical Transport Network (OTN), as well as other types of networks. In some implementations consistent with the principles of the invention, authenticator devices 104 may include encryption/decryption capabilities.

Figure 2:
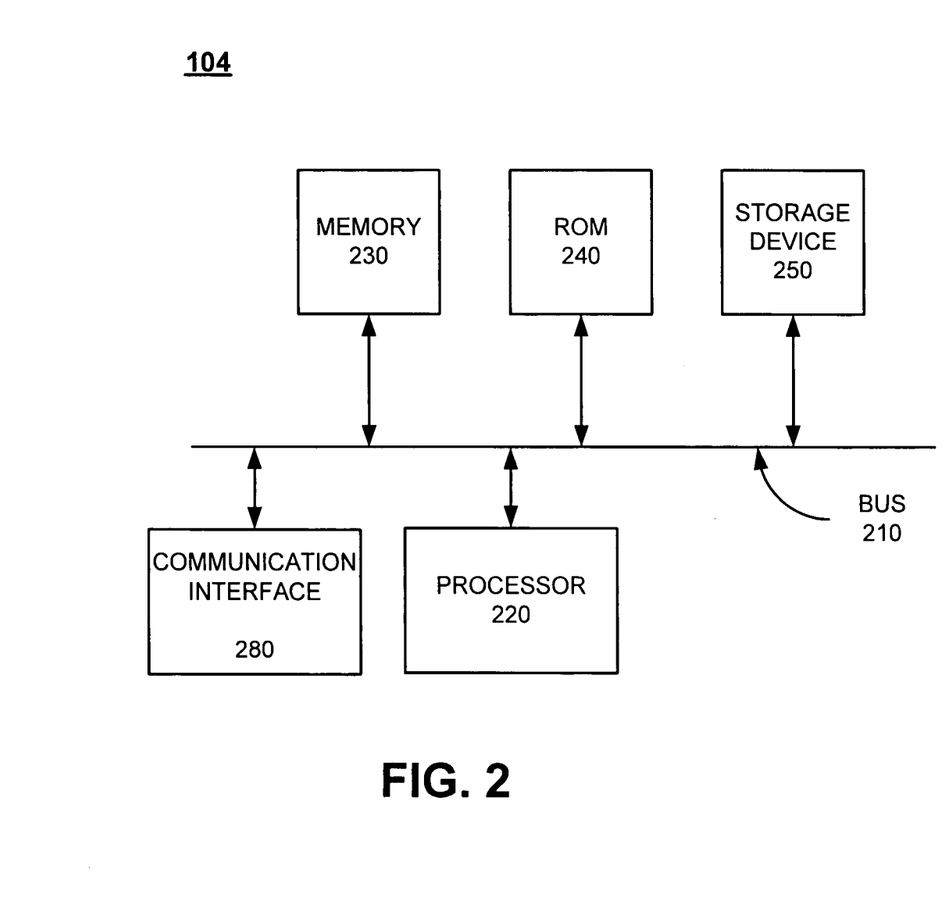
FIG. 2 is a detailed block diagram of an exemplary authenticator device shown in FIG. 1.

FIG. 2 illustrates an exemplary implementation of one of authenticator devices 104 consistent with the present invention. Authenticator device 104 may include a bus 210, a processor 220, a memory 230, a read only memory (ROM) 240, and a communication interface 280. The bus 210 permits communication among the components of authenticator device 104.

Processor 220 may include a conventional processor or microprocessor or another type of processing logic that interprets and executes processing instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220.

Communication interface 280 may include any transceiver-like mechanism that enables authenticator device 104 to communicate via a network. For example, communication interface 280 may include a modem or an Ethernet interface for communicating via a local area network (LAN). Alternatively, communication interface 280 may include other mechanisms for communicating with other devices and/or systems via wired, wireless or optical connections. In an implementation in which authenticator device 104 is included in user equipment, such as a personal computer (not shown), authenticator device 104 may communicate with components of the personal computer via a bus.

Authenticator device 104 may perform functions in response to processor 220 executing sequences of instructions contained in a computer-readable medium, such as memory 230. A computer-readable medium may include one or more memory devices and/or carrier waves. Such instructions may be read into memory 230 from another computer-readable medium, such as storage device 250, or from a separate device via communication interface 280.

Execution of the sequences of instructions contained in memory 230 may cause processor 220 to perform certain acts that will be described hereafter. In alternative implementations, hard-wired circuitry or logic may be used in place of or in combination with software instructions to implement the present invention. For example, authenticator device 104 may be implemented via hardware logic, such as a Field Programmable Gate Array (FPGA) or an Application Specific Integrated Circuit (ASIC). Such implementations may be more suitable for high speed data processing. Thus, the present invention is not limited to any specific combination of hardware circuitry and software.

Exemplary Processing

In one embodiment consistent with the principles of the invention, authenticator device 104 may accept a data message when the data message is received with a valid associated ICV and N−1 previous consecutive data messages have been received with valid associated ICVs. The ICVs may have a small size, such as, for example, 32 bits. Although the probability of receiving a valid 32 bit ICV with received random data or noise is about one in four billion ($\frac{1}{2}^{32}$), the probability of accepting N random data messages or noise with N valid 32 bit ICVs is $\frac{1}{2}^{32 \times N}$. Thus, if N=8, then the probability of falsely accepting eight consecutive random data messages or noise with valid 32 bit ICVs is $\frac{1}{2}^{256}$, which is extremely low ($8.6 \times 10^{-78}$).

Figure 3:
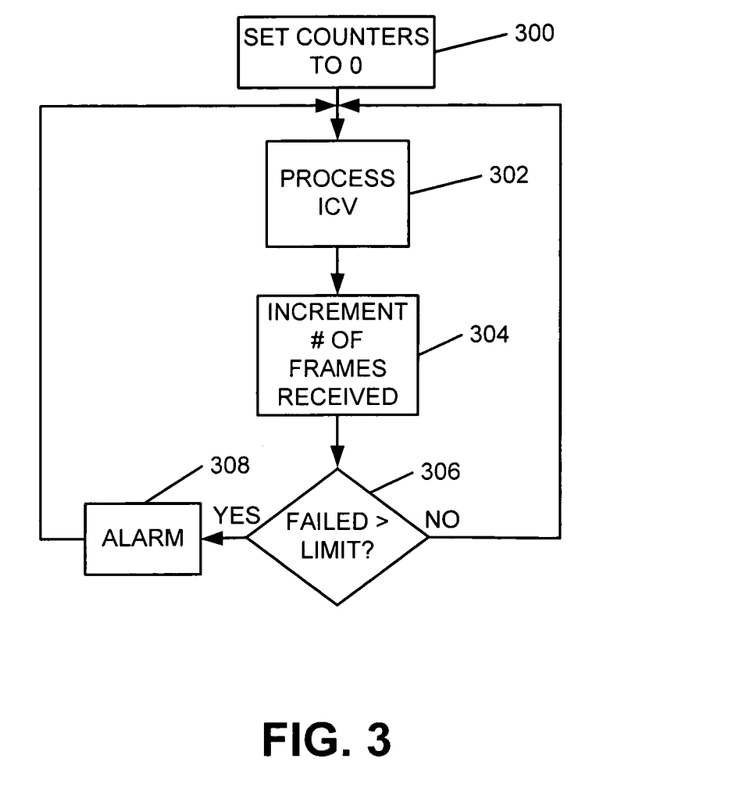
FIGS. 3 and 4 are flowcharts that illustrate exemplary processing in an authenticator device consistent with the principles of the invention.
Figure 4:
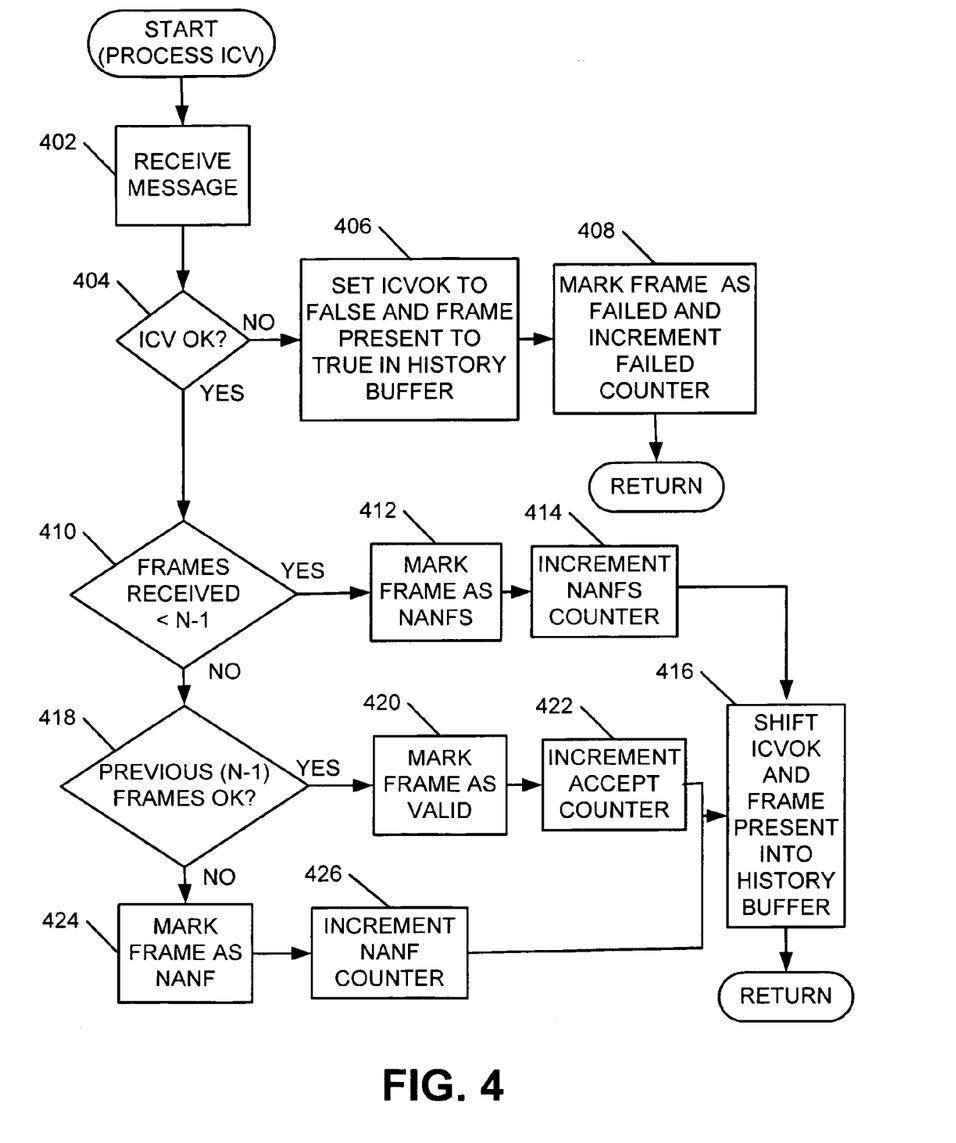
Figure 5:
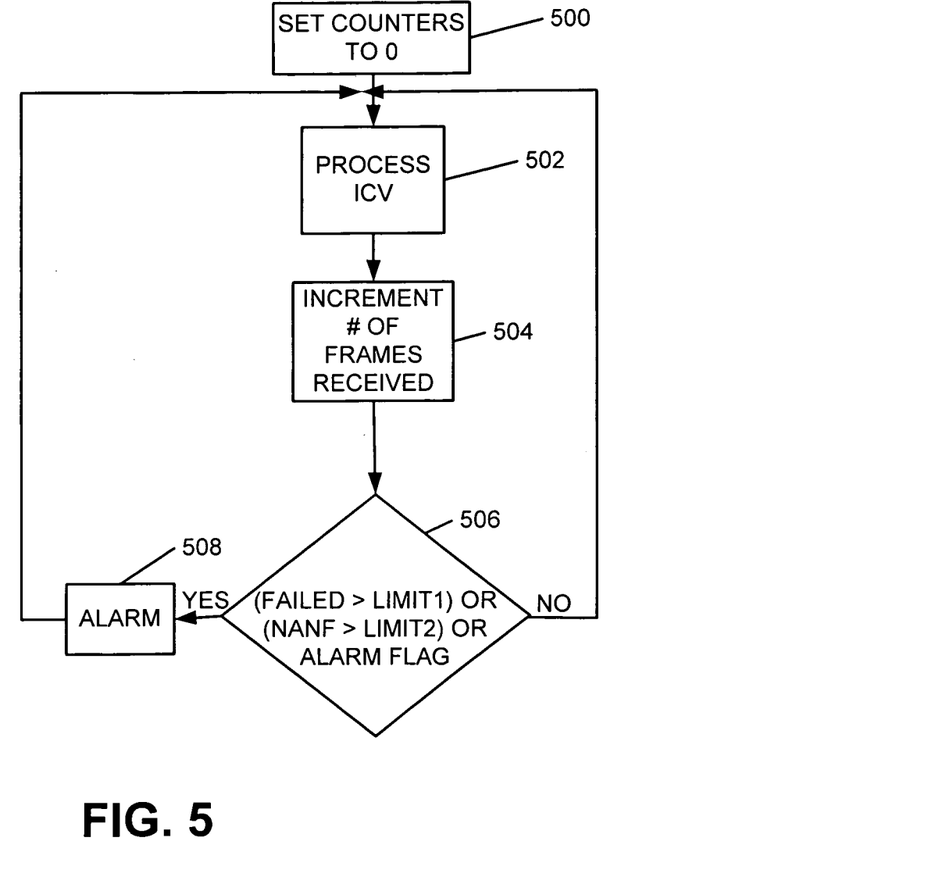
FIGS. 5 and 6A-6C are flowcharts that illustrates exemplary processing in another implementation of an authenticator device consistent with the principles of the invention.

FIGS. 3 and 4 are flowcharts that illustrate exemplary processing in an implementation of authenticator device 104 consistent with the principles of the invention. Processing may begin with authenticator device 104 setting various counters to zero (act 300), such as, for example, #of Frames-Received counter (a counter for counting a number of messages received), Accept counter (a counter for counting a number of messages accepted), Failed counter (a counter for counting a number of messages with invalid associated ICVs), Not Accepted Not Failed StartUp (NANFS) counter (a counter for counting a number of messages received with valid associated ICVs, which are neither failed nor accepted, during a startup phase) and NANF counter (a counter for counting a number of messages received with valid associated ICVs, which are not failed or accepted, after a StartUp phase). Authenticator device 104 may maintain a history buffer for keeping track of the status of a number of previously received frames. Authenticator device 104 may use two binary bits of information to keep track of the status of each previously received frame. The two bits may represent ICV ok and frame present. Authenticator device 104 may initialize the history buffer entries to bits 00 for each entry (act 300), indicating ICV not ok and frame not present. The history buffer may be large enough to store the history of N−1 frames. As received ICVs are determined to be valid, authenticator device 104 may shift bits 11, indicating ICV ok and frame present, into the history buffer. When a received ICV is determined to be invalid, authenticator device 104 may shift bits 01, indicating ICV not ok and frame present, into the history buffer.

After initializing counters and the history buffer, authenticator device 104 may receive and process a data message (act 302). FIG. 4 illustrates, in detail, exemplary processing of act 302 in an implementation of authenticator device 104. Authenticator device 104 receives the data message (act 402) and determines whether the associated ICV is valid (act 404). For example, if the associated ICV was generated using HMAC/SHA-1 with a key, then authenticator device 104 may use the HMAC/SHA-1 algorithm and the same key on the received data to generate an ICV. If the ICV matches the associated ICV, then the associated ICV is valid. If authenticator device 104 determines that the ICV is not valid, then authenticator device 104 may set the values in the history buffer corresponding to the frame to ICV not ok (0) and frame present (1) by shifting bits 01 into the history buffer (act 406). Authenticator device 104 may then mark the frame as failed and may increment the Failed counter (act 408).

If authenticator device 104 determines that the associated ICV is valid (act 404) then authenticator device 104 may then determine whether the #of FramesReceived counter is less than some value, for example, N−1 (act 410). If the #of FramesReceived counter is less than N−1, then fewer than N total frames have been received (note that the #of FramesReceived counter is one less that the actual number of frames received) and authenticator device 104 is in a StartUp phase. When a frame with a valid associated ICV is received in the StartUp phase, authenticator device 104 may mark the frame as not accepted not failed startup (NANFS) (act 412) and may increment the NANFS counter (act 414). Authenticator device may then shift bits 11 (frame ok and frame present) into the history buffer.

If authenticator device 104 determines that #of FramesReceived is not less than some number, for example, N−1 (act 410) then authenticator device 104 is not in the StartUp phase. Authenticator device 104 may then determine whether the previous N−1 frames were received with a valid associated ICV (act 418) by checking the history buffer entries corresponding to the previously received N−1 frames. If authenticator device 104 determines that the previous N−1 frames were received with valid associated ICVs, then the frame is marked as valid and the Accept counter is incremented (act 422).

If authenticator device 104 determines, by checking the history buffer entries, that the previously received N−1 frames do not all have valid associated ICVs, then authenticator device 104 may mark the frame as NANF (act 424) and may increment the not accepted not failed (NANF) counter (act 426).

When authenticator device 104 does not have a frame marked valid to accept and pass to a recipient, authenticator device 104 may change the frame into a null frame, such that the recipient's device may continue to receive signals and may continue to remain synchronized.

Returning to FIG. 3, authenticator device 104 may increment #of FramesReceived counter (act 304). When #of FramesReceived counter is less than a predefined value, for example, N−1, authenticator device 104 may be considered to be in a StartUp phase. Authenticator device 104 may then check whether the Failed counter is greater than a predetermined limit (act 306), for example 3. Alternatively, authenticator device 104 may instead determine whether a ratio of a value of the Failed counter to a value of the Accept counter (number of messages accepted) is greater than a predetermined limit. If the condition (act 306) is true, authenticator 104 may generate an alarm (act 308). The alarm may be indicated by a message on a display, by a sound on a speaker, by an e-mail message sent to a particular e-mail address, or any other method suitable for indicating an alarm.

Authenticator device 104 may then continue processing the next received data message via acts 302-308 and 402-426.

As a variation to the above implementation, a StartUp phase may be eliminated. For example, whenever, the previous N−1 received frames are not all valid (i.e. this may occur when fewer than N−1 frames were received or when any of the previous N−1 frames were frames with invalid associated ICVs), authenticator device 104 may increment the NANF counter (this implementation would not use the NANFS counter).

Alternative Exemplary Processing

In another implementation consistent with the principles of the invention, a received data message with a valid associated ICV may be delivered first and when authenticator device 104 receives the following N−1 consecutive data messages with valid associated ICVs, authenticator device 104 may count the data message as accepted. Such an implementation may be beneficial when avoiding delays outweighs the quality of integrity protection. Because data messages may be delivered to a recipient before determining whether the next N−1 consecutive data messages are received with valid associated ICVs, an alarm may be generated after the data message is delivered to the recipient. In this implementation, the probability of delivering a single random data message with a valid associated ICV to a recipient is still high (assuming that each ICV is 32 bits in length) at $\frac{1}{2}^{32}$, but the probability of accepting the data message without generating an alarm is $\frac{1}{2}^{32N}$.

FIGS. 5 and 6A-6C are flowcharts that illustrate exemplary processing of authenticator device 104 in this implementation consistent with the principles of the invention. Processing may begin with authenticator device 104 setting various counters to zero (act 500), such as, for example, the #of FramesReceived counter, the Accept counter, the Failed counter and the NANF counter. Authenticator device 104 may maintain a history buffer for keeping track of the status of a number of received frames. As in the previous implementation, authenticator device 104 may use two bits of information to keep track of the status of each previously received frame. The two bits may represent ICV ok and frame present. Authenticator device 104 may initialize the history buffer entries to 00 for each entry (act 500), indicating ICV not ok and frame not present. The history buffer may be large enough to store the history of N−1 frames. Authenticator device 104 may then receive and process a data message and the associated ICV (act 502).

Figure 6A:
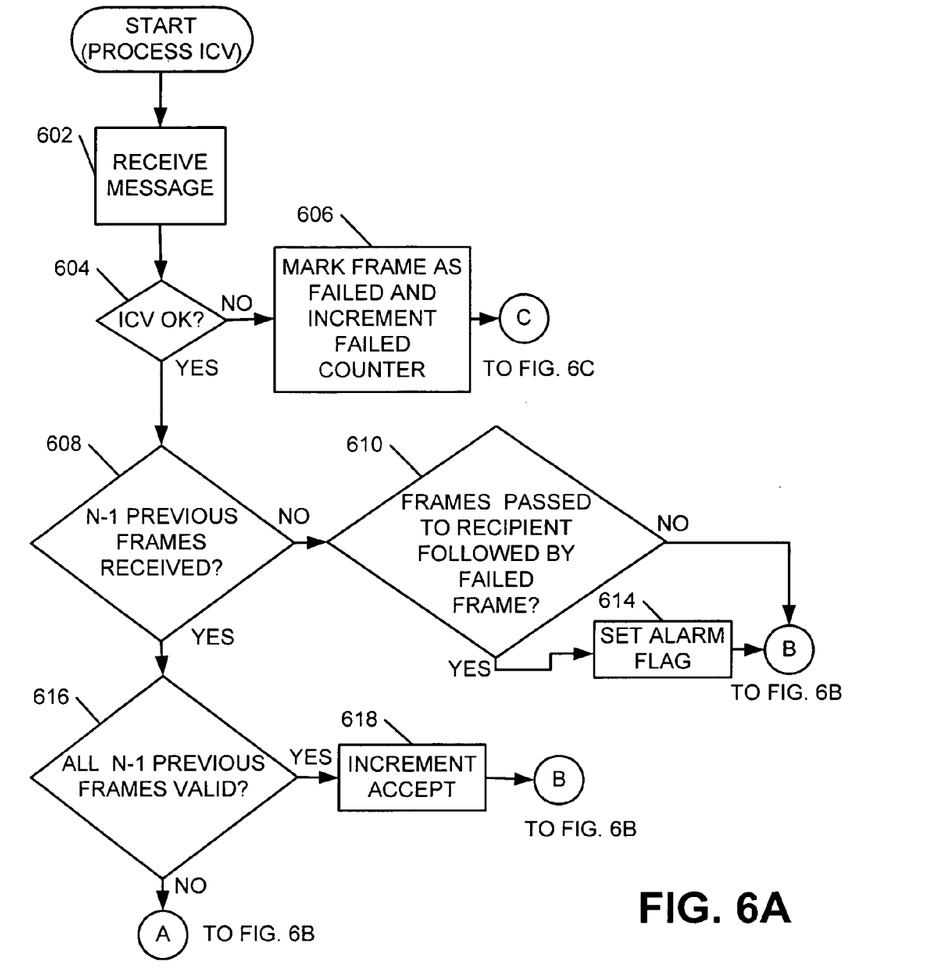
Figure 6B:
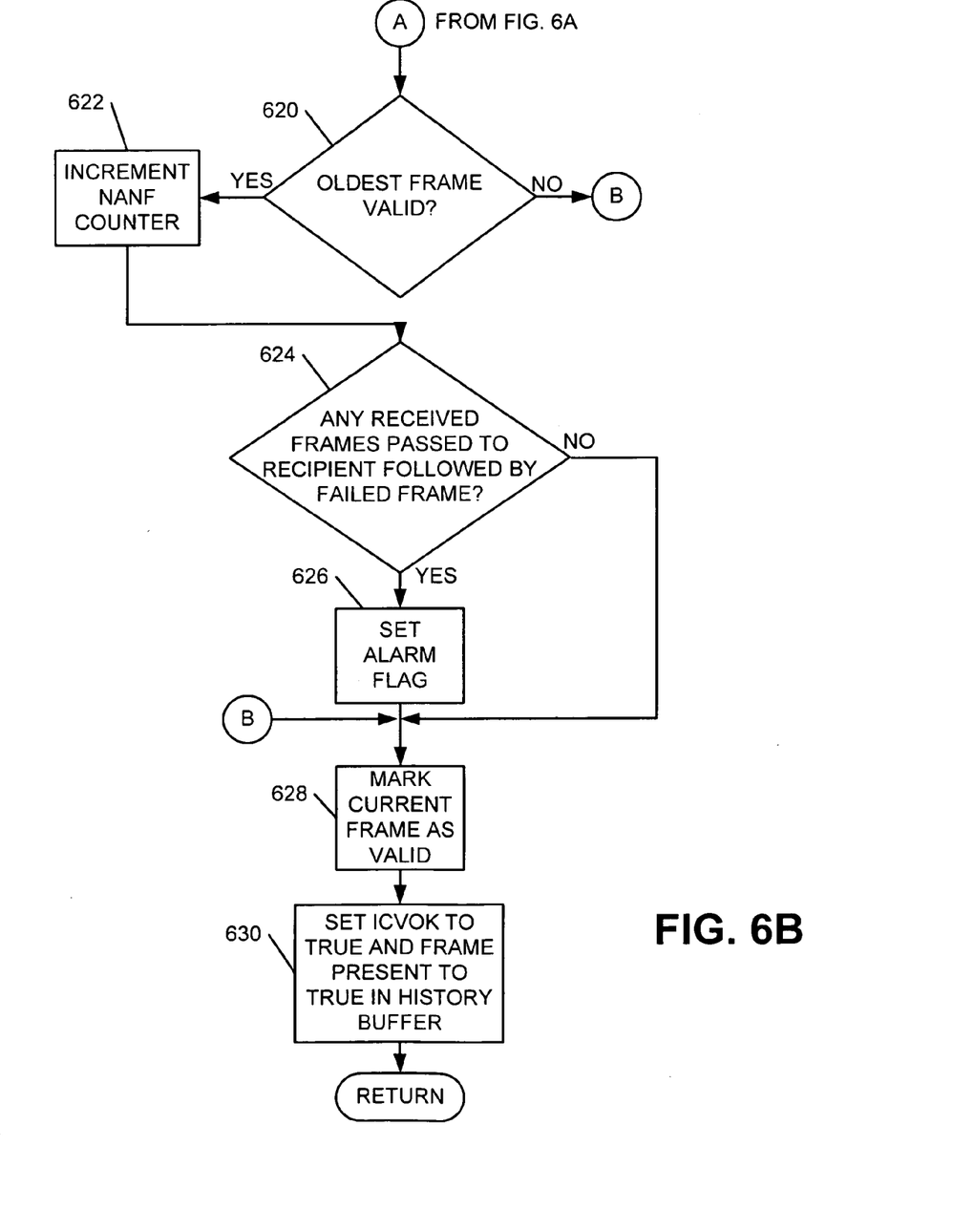
Figure 6C:
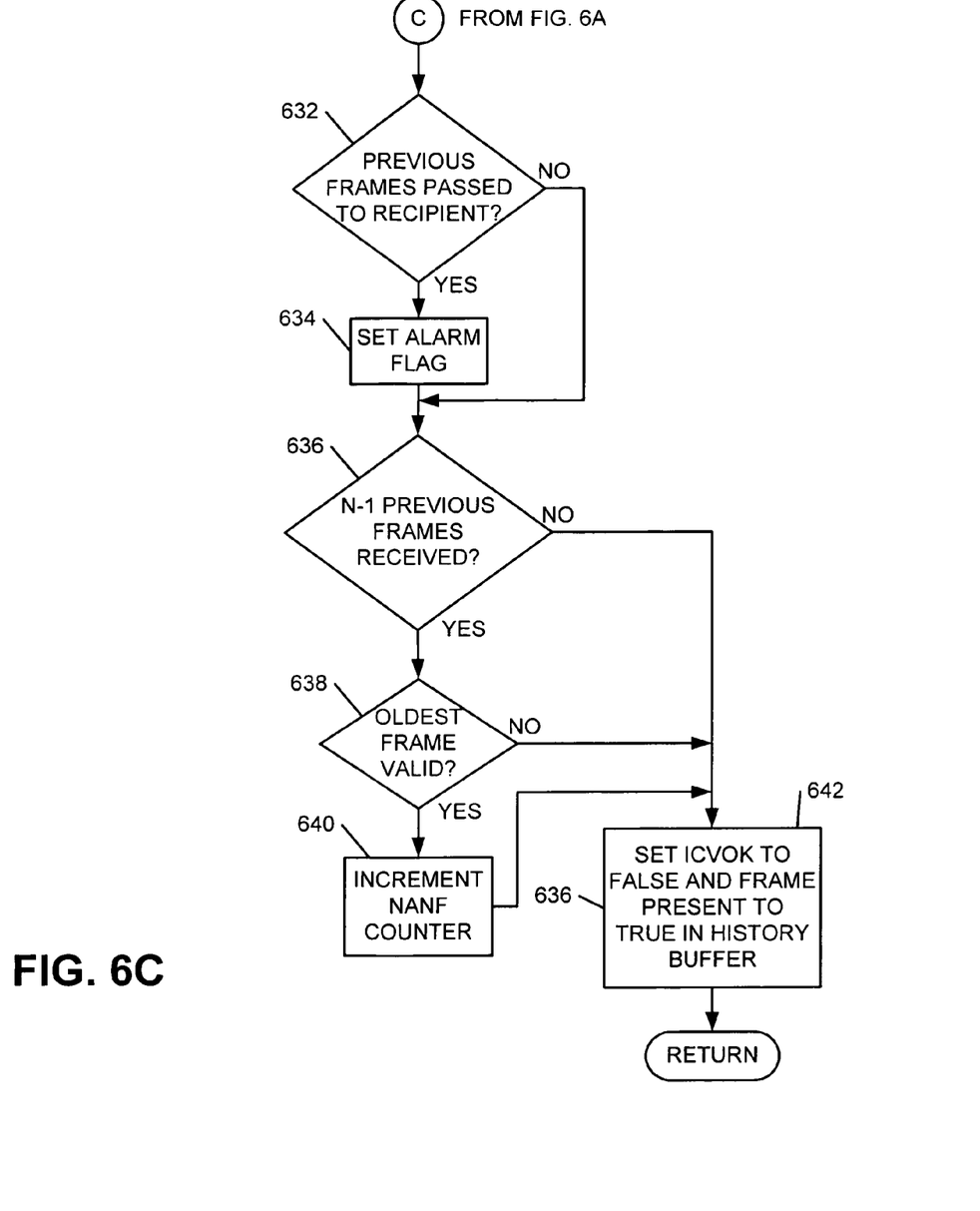

FIGS. 6A-6C illustrate exemplary processing of act 502 in this implementation of authenticator device 104. Authenticator device 104 may receive the data message (act 602) and may determine whether the associated ICV is valid (act 604). Authenticator device 104 may determine validity of an ICV in the same manner as discussed above with respect to act 404. If authenticator device 104 determines that the associated ICV is not valid, authenticator device 104 may mark the frame as failed and may increment the Failed counter (act 606). Authenticator device 104 may then determine whether a frame was passed to the recipient within the last N−1 frames by checking the history buffer (act 632: FIG. 6C). If a valid frame was passed to the recipient, a frame was delivered that did not satisfy conditions for acceptance (i.e., the following N−1 frames were not all valid). Authenticator device 104 may then set the alarm flag to cause an alarm to be generated (act 634). Authenticator device 104 may then determine whether N−1 previous frames were received by checking the #of FramesReceived counter (act 636). If N−1 previous frames were received, then authenticator device 104 may determine whether the entry in the history buffer corresponding to the oldest frame indicates that the oldest frame had a valid ICV (act 638). If so, then authenticator device 104 may increment the NANF counter (act 640). Otherwise, the oldest frame was a failed frame and the Failed counter had already been incremented. Authenticator device 104 may then set ICVOK to false and frame present to true by shifting 01 into the history buffer (act 642).

If authenticator device 104 determines that the associated ICV is valid (act 604: FIG. 6A) then authenticator device 104 may determine whether N−1 previous frames have been received (act 608) by checking the #of FramesReceived counter. If N−1 frames have not been received, then authenticator 104 may determine whether any of the previously received frames, if any, were passed to the recipient followed by the reception of a frame with an invalid associated ICV (act 610). If so, then a frame was passed to the recipient when the following N−1 frames are not all valid. In such a case, authenticator device 104 may set an alarm flag to cause an alarm to be generated (act 614). If authenticator device 104 determines that no frames had been passed to the recipient followed by a frame with an invalid ICV (act 610) then authenticator device 104 may mark the frame as valid (act 628) and may shift bits 11 into the history buffer indicating a frame with a valid ICV (ICVOK is true) and frame present (frame present is true) (act 630: FIG. 6B).

If authenticator device 104 determines that N−1 previous frames have been received (act 608: FIG. 6A), authenticator device 104 may check the history buffer to determine whether N−1 previous frames were received with valid associated ICVs (act 616). If authenticator device 104 determines that the previous N−1 frames were all received with valid associated ICVs, then authenticator device 104 may increment the accept counter because a valid frame was received followed by N−1 valid frames (act 618) and may mark the current frame as valid (act 628) and update the history buffer to indicate that a valid frame was received (act 630).

If authenticator device 104 determines that not all of the previously received N−1 frames are valid (act 616), then authenticator device 104 may determine whether the oldest frame, according to the history buffer, had a valid ICV (act 620). If the oldest frame had an invalid ICV, then the failed counter was already incremented and authenticator device 104 may the mark the current frame as valid (act 628) and may update the history buffer (act 630). If authenticator device 104 determines that the oldest frame was valid (act 620), then authenticator device 104 may increment the NANF counter (act 622). Authenticator device 104 may then check the history buffer to determine whether any of the last N−1 frames were passed to the recipient followed by a frame with an invalid ICV (act 624). If so, a frame was passed to the recipient when not all of the following N−1 frames had valid ICVs and authenticator device 104 may set the alarm flag (act 626) to cause an alarm to be generated (act 626). Authenticator device 104 may then mark the current frame as valid (act 626) and may update the history buffer (act 630).

Authenticator device 104 may pass only frames marked as valid to the recipient. When no valid frame is ready to be passed to the recipient and a frame must be transmitted, a null frame may be transmitted in order to maintain signaling to the recipient.

Returning to FIG. 5, authenticator device 104 may increment the #of FramesReceived counter (act 504). Authenticator device 104 may then determine whether an alarm should be generated by checking whether the Failed counter is greater that a predetermined limit (Limit1), such as, for example, 1 or 3, or whether the NANF counter is greater than another predetermined limit (Limit2), for example, 1 or 2, or whether the Alarm flag is set (act 506). As an alternative, authenticator device 104 may determine whether a ratio of a value of the Failed counter to a value of the Accept counter (number of messages accepted with valid ICVs and followed by N−1 messages with valid ICVs) is greater than a predetermined limit. If authenticator device 104 determines that an alarm should be generated (act 506) then authenticator device 104 may generate the alarm (act 508) by, for example, indicating a message on a display, by a sound on a speaker, by an e-mail message sent to a particular e-mail address, or any other method suitable for indicating an alarm.

Authenticator device 104 may then continue processing a next received message via acts 500-508 and 602-642.

As a variation of the above implementation, data delivery may be delayed for several frames, such as N−1 frames, and only delivered when the received frame has a valid associated ICV and the following N−1 frames are received with valid associated ICVs. Such an implementation is better than the previous implementation in cases when the quality of integrity protection is more important than avoiding delays. Authenticator device 104 may have a FIFO or circular buffer such that one frame is always being written to the buffer and one frame is always being read from the buffer. Given the above ICVOK and frame present bit encoding, these bits could be stored as auxiliary information with the buffer slots in a hardware implementation. Just as a frame is clocked out of the buffer to the recipient, the ICVOK and frame present bits may be retrieved from the next buffer.

Other Variations

The above exemplary implementations illustrate an authenticator device 104 that considered a frame accepted when the frame is received with a valid associated ICV and the previous N−1 frames were received with valid associated ICVs and an authenticator device 104 that considers a frame accepted if the frame is received with a valid associated ICV and the following N−1 frames are also received with valid associated ICVs. Other variations are also possible and would be obvious to one of ordinary skill in the art. For example, authenticator device 104 may consider a frame with a valid associated ICV to be accepted if the previous N−1 frames were received with valid associated ICVs and the following M−1 frames were received with valid associated ICVs.

The above implementations assume that each of the data messages include an ICV. In some circumstances, it may be desirable to send associated ICVs separately from the data messages. For example, if data messages arrive as a data stream, ICVs may be sent out-of-band (i.e., via a communication channel different from the channel used for the data messages). During processing, authenticator device 104 may divide the data stream into portions of a fixed size (a pseudoframe size), for example, 1024 bits or any other suitable size. Each pseudoframe may include a pseudoframe number. Each received out-of-band ICV message may be associated with a portion of the received data stream by including a pseudoframe number and optionally, a portion of the data message, with the ICV indicating to which pseudoframe the ICV is associated. ICVs may be sent using a well-known reliable delivery mechanism, such as, for example, Transmission Control Protocol (TCP), Stream Control Transmission Protocol (SCTP), Reliable Data Protocol (RDP), or any other suitable protocol.

By using an out-of-band ICV approach, an associated ICV may arrive long after the corresponding data message. Data may be buffered so that an invalid data message (a data message with an invalid ICV) will not be delivered to the recipient. Authenticator device 104 may provide a null frame or a loss-of-data indication during times when there are no authenticated data messages to deliver. One way that this could be implemented in authenticator device 104 is by dynamically adjusting a length of a delay buffer. Authenticator device 104 may increase the length of the delay buffer at a time when a frame should be sent, but the ICV for a received frame has not yet arrived. Such an event is called a stall. When the delay buffer has been more than adequately full for a long time, for example, minutes, authenticator device 104 may reduce the length of the delay buffer. If the recipient is delay sensitive, authenticator device 104 may be implemented such that stalls occur more frequently, but with a smaller delay.

Authenticator device 104 may adjust the delay, such that the stall rate would be below a threshold of acceptability.

Implementations of authenticator device 104, consistent with the principles of the invention, may encode the ICV using HMAC/SHA-1, HMAC/MD5 or any other suitable method and may truncate the generated code, if necessary, to a small number of bits, such as, for example, 32 bits.

Conclusion

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain aspects have been described as implemented in hardware and others in software, other configurations may be possible.

While series of acts have been described with regard to FIGS. 3-6C, the order of the acts is not critical. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method for receiving a plurality of data messages via a network, the method comprising:
receiving one of said data messages via the network prior to receiving other of said data messages;
determining whether the one data message has an associated valid integrity check value included, and received, with the one data message;
determining whether a specific number of said other data messages has been received, each of said specific number of said other data messages having an associated valid integrity check value included, and received, with said respective other data message, said respective other data message integrity check value being unrelated to other integrity check values associated with other of said specific number of said other data messages, when it is determined that the one data message has been received with the associated valid integrity check value included with the one data message; and
accepting the one data message when it is determined that each of the specific number of said other data messages, received subsequently to receipt of said one data message, has been received with its associated valid integrity check value included in the respective other data message.

2. The method of claim 1, further comprising:
receiving each of the associated integrity check values separately from the corresponding data messages.

3. The method of claim 1, further comprising:
delivering the one data message to a recipient.

4. The method of claim 3, wherein:
the delivering occurs after the specific number of the other data messages are received.

5. The method of claim 3, wherein:
the delivering occurs before the specific number of the other data messages are received.

6. The method acclaim 3, further comprising:
generating an alarm when the one data message was delivered to the recipient and at least one of the specific number of the other data messages has an associated invalid integrity check value.

7. The method of claim 1, further comprising incrementing an accept counter when accepting the one data message.

8. The method of claim 1, further comprising:
incrementing a failed counter when a data message is received with an invalid associated integrity check value.

9. The method of claim 1, further comprising:
incrementing a Not Accepted Not Failed counter when a valid message is received and at least one of the specific number of data messages has an invalid associated integrity check value.

10. The method of claim 1, further comprising:
counting a number of accepted ones of the data messages as accepted encrypted data messages,
counting a number of failed ones of the data messages received with an associated invalid integrity check value as failed encrypted data messages, and
determining whether to generate an alarm based on at least one of the number of the accepted ones or the number of the failed ones.

11. The method of claim 10, wherein the determining whether to generate an alarm comprises:
determining whether the counted number of failed ones of the encrypted data messages is greater than a predetermined limit.

12. The method of claim 10, wherein the determining whether to generate an alarm comprises:
determining whether a ratio of the counted number of failed ones of the encrypted data messages to the counted number of accepted ones of the encrypted data messages is greater than a predetermined limit.

13. The method of claim 1, wherein the receiving comprises:
receiving the one data message included in a data stream of data messages.

14. An apparatus for receiving data messages via a network, the apparatus comprising:
hardware logic configured to:
receive a plurality of data messages subsequent to receipt of a data message with its own integrity check value included with said data message, each of said plurality of data messages associated with and including its own respective integrity check value unrelated to other integrity check values associated with other of said plurality of data messages,
determine whether a predetermined number of received ones of the data messages were received with valid ones of the associated integrity check values, a respective one of said values included and received with its respective data message, and
accept said data message when the hardware logic determines that each of the predetermined number of subsequently received ones of the data messages was received with a valid one of the associated integrity check values included with the respective message.

15. The apparatus of claim 14, wherein the hardware logic is further configured to:
receive each of the associated integrity check values separately from the corresponding data messages.

16. The apparatus of claim 14, wherein the hardware logic is further configured to:
deliver at least some of the data messages to a recipient.

17. The apparatus of claim 16, wherein the hardware logic is further configured to:

deliver the at least some of the data messages to a recipient before the predetermined number of received ones of the data messages are received.

18. The apparatus of claim 16, wherein the hardware logic is further configured to:
deliver the at least some of the data messages to a recipient after the predetermined number of received ones of the data messages are received.

19. The apparatus of claim 16, wherein the hardware logic is further configured to:
generate an alarm when one of the at least some of the data messages were delivered to the recipient and at least one of the predetermined number of received ones of the data messages has an associated invalid integrity check value.

20. The apparatus of claim 14, wherein the hardware logic is further configured to:
keep track of a receive status of each of the predetermined number of received ones of the data messages.

21. The apparatus of claim 14, wherein the hardware logic is further configured to:
count a number of accepted data messages, and
count a number of data messages received with an invalid one of the integrity check values.

22. The apparatus of claim 21, wherein the hardware logic is further configured to:
generate an alarm when the count of the data the messages received with an invalid one of the integrity check values exceeds a predetermined limit.

23. The apparatus of claim 21, wherein the hardware logic is further configured to:
generate an alarm based on at least one of the count of a number of accepted data messages or the count of a number of data messages received with an invalid one of the integrity check values.

24. The apparatus of claim 21, wherein the hardware logic is further configured to:
generate an alarm when a ratio of the count of data messages received with an invalid one of the integrity check values to the count of accepted data messages is greater than a predetermined limit.

25. The apparatus of claim 14, wherein the hardware logic is further configured to:
receive the plurality of data messages included in a data stream.

26. The apparatus of claim 14, wherein the hardware logic is further configured to:
analyze each of the integrity check values associated with the received data messages, the integrity check values having been generated using, a Hashed Message Authentication Code and Secure Flashed Algorithm 1 (HMAC/SHA-1).

27. The apparatus of claim 14, wherein the hardware logic is further configured to:
analyze each of the integrity check values associated with the received data messages, the integrity check values having been generated using a Hashed Message Authentication Code and Message Digest Algorithm #5 (HMAC/MD5).

28. An apparatus for receiving data messages via a network, the apparatus comprising:
means for receiving a plurality of data messages subsequent to receipt of a data message with its own integrity check value included with said data message, each of said messages having and including an associated integrity check value unrelated to other integrity check values associated with other of said plurality of data messages,
means for determining whether a predetermined number of received ones of the data messages each includes a valid one of the associated integrity check values when received, and
means for accepting said data message when the means for determining determines that the predetermined number of subsequently received ones of the messages each includes a respective valid one of the associated integrity check values.

29. A non-transitory machine-readable medium, said medium having a plurality of instructions for a processor stored therein, wherein when the plurality of instructions is executed by the processor; the processor is configured to:
receive a plurality of data messages subsequent to receipt of a data message with its own integrity check value included in said data message, each of said plurality including an associated integrity check value unrelated to other integrity check values associated with other of said plurality of data messages,
determine whether a predetermined number of the data messages were each received with its own associated valid integrity check value included in the respective message, and
accept said data message when the processor determines that the predetermined number of the data messages were each received with its own associated valid integrity check value included in the respective message.

30. The machine-readable medium of claim 29, wherein the processor is further configured to:
receive each of the associated ones of the integrity check values separately from the corresponding data messages.

31. The machine-readable medium of claim 29, wherein the processor is further configured to:
deliver at least some of the data messages to a recipient.

32. The machine-readable medium of claim 31, wherein the processor is further configured to:
deliver the at least some of the data messages to a recipient before the predetermined number of received ones of the data messages are received.

33. The machine-readable medium of claim 31, wherein the processor is further configured to:
deliver the at least some of the data messages to a recipient only after the predetermined number of received ones of the data messages are received.

34. The machine-readable medium of claim 31, wherein the processor is further configured to:
generate an alarm when one of the at least some of the data messages were delivered to the recipient and at least one of the predetermined number of received ones of the data messages has an associated invalid one of the integrity check values.

35. The machine-readable medium of claim 29, wherein when the processor
accepts the at least one of the predetermined number of the data messages, the processor is further configured to:
increment a counter to keep track of a number of accepted ones of the data messages.

36. The machine-readable medium of claim 29, wherein the processor is further configured to:
count a number of accepted ones of the data messages, and
count a number of failed ones of the data messages, the failed ones of the data messages being ones of the data messages having invalid ones of the associated integrity check values.

37. The machine-readable medium of claim 36, wherein the processor is further configured to:

generate an alarm when the count of the received failed ones of the data messages exceeds a predetermined limit.

38. The machine-readable medium of claim 36, wherein the processor is further configured to:
generate an alarm based on at least one of the count of a number of accepted ones of the data messages or the count of a number of failed ones of the data messages.

39. The machine-readable medium of claim 36, wherein the processor is further configured to:
generate an alarm when a ratio of the count of failed ones of the data messages to the count of accepted ones of the data messages is greater than a predetermined value.

40. A method, comprising:
receiving a plurality of data messages via a network;
establishing a predetermined number of consecutively-received ones of said data messages each one of said consecutively-received messages having and including an associated integrity check value that is unrelated to all other integrity check values, said predetermined number being less than or equal to said plurality of data messages;
receiving, seriatim, said predetermined number of consecutively-received ones of said data messages together with their respective included integrity check values as message-value pairs; and
accepting the first received one of said predetermined number of said consecutively-received ones of said data messages when each one of said respective included integrity check values is determined to be valid.

* * * * *